Aug. 3, 1965 H. J. STINGER 3,198,927

ELECTROMAGNETIC COMPRESSION APPARATUS

Original Filed July 21, 1960 4 Sheets-Sheet 1

INVENTOR
HENRY JOSEPH STINGER

BY Harry C. Braddock
ATTORNEY

ELECTROMAGNETIC COMPRESSION APPARATUS
Original Filed July 21, 1960 4 Sheets-Sheet 2
FIG. 4
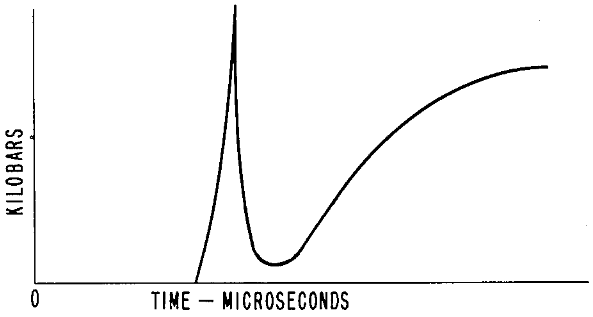
FIG. 5
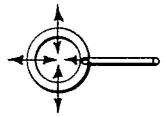
FIG. 6
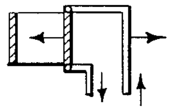
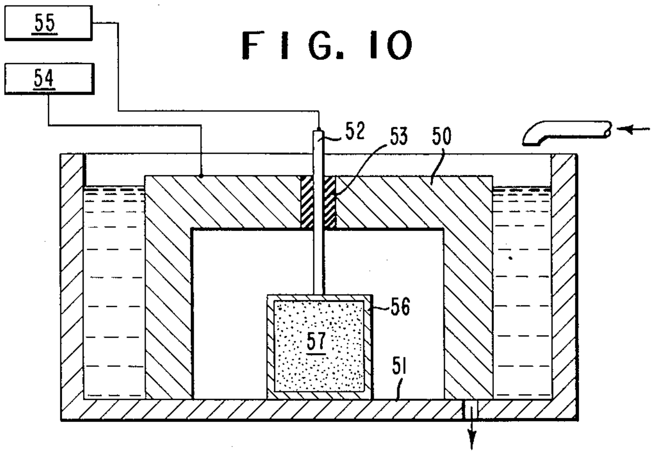
FIG. 7
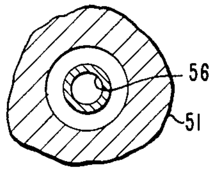
FIG. 8
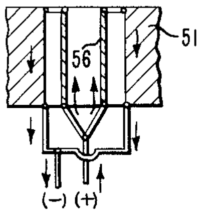
FIG. 11
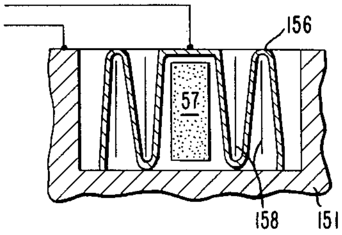
FIG. 12
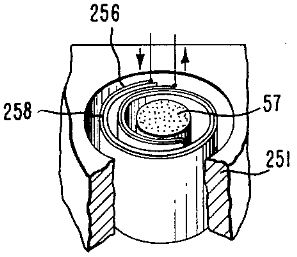
FIG. 9
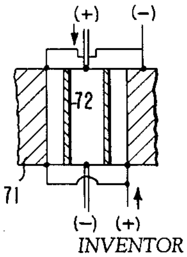
INVENTOR
HENRY JOSEPH STINGER
BY Harry C. Braddock
ATTORNEY Aug. 3, 1965 H. J. STINGER 3,198,927

ELECTROMAGNETIC COMPRESSION APPARATUS

Original Filed July 21, 1960 4 Sheets-Sheet 3

INVENTOR
HENRY JOSEPH STINGER

BY Harry C. Braddock
ATTORNEY

Aug. 3, 1965 H. J. STINGER 3,198,927

ELECTROMAGNETIC COMPRESSION APPARATUS

Original Filed July 21, 1960 4 Sheets-Sheet 4

INVENTOR

HENRY JOSEPH STINGER

BY Harry C. Braddock

ATTORNEY

United States Patent Office 3,198,927
Patented Aug. 3, 1965

3,198,927
ELECTROMAGNETIC COMPRESSION APPARATUS

Henry Joseph Stinger, Mendenhall, Pa., assignor to E. I. du Pont de Nemours and Company, Wilmington, Del., a corporation of Delaware Original application July 21, 1960, Ser. No. 44,461, now Patent No. 3,149,372, dated Sept. 22, 1964. Divided and this application June 25, 1964, Ser. No. 378,017
4 Claims. (Cl. 219—7.5)

This application is a division of my copending application Serial No. 44,461, filed July 21, 1960, now Patent No. 3,149,372, dated September 22,1964—by authority of MOPEP 201.11.

This invention relates generally to the field of converting electrical energy substantially directly to mechanical energy, and is concerned with novel improved means and methods for effectively converting rapidly released high energy electrical discharges into high power impulses capable of performing useful work. Also involved are novel means and methods of controlling and directing such energy conversions.

It is known that the sudden release of energy in the form of an electrical arc or spark in a fluid will produce a sudden expansion in the fluid. Also, past experiments have shown that it is possible to literally explode a wire conductor by applying thereto a sudden high energy pulse of electrical energy. This is known as E.W.P. (exploding wire phenomenon).

It is one object of this invention to provide novel and useful arrangements for effective accomplishment of useful work directly from the effects of sudden high energy electrical impulses.

It is an object of this invention to control and effectively apply the energy released by electrical discharges, in the form of arcs or exploding conductors, to perform useful work.

It is an object of this invention to provide new and improved apparatus capable of continuous operation for performing useful work utilizing the energy of high energy electrical impulses in practical commercial applications.

It is another object of this invention to provide novel apparatus and methods of special utility and benefit to the art of forming substantially solid articles from powdered or particulate material.

Yet another object is the provision of a novel arrangement by which the energy of electrical impulses may be utilized to disintegrate or comminute masses of material.

A further object is the provision of a simple and effective arrangement for forming and deforming solid articles by controlled application of high energy electrical impulses.

These and other objects have been achieved in means and methods which use electrical energy released at a very high rate. In one case the energy is released so that no arc, spark, or rupture of electrical conductors occurs; in this case it is noted that magnetic field forces alone can be utilized effectively to create high rate energy impulses for useful work. In a preferred second case, electrical energy released at a high rate isused to create magnetic fiield forces concurrently with arcs or conductor explosions, so that the resulting interaction of the two serves to restrain, control, and direct the energy of the arcs or exploding conductors for maximum practical effects.

One arrangement causes each impulse of electrical energy to provide (a) the effects to vaporize a conductor, (which produces shock and pressure waves), (b) the magnetic field effect to restrain the vaporization reaction and the vaporized material until a critical point is reached, and (c) an additional magnetic effect to feed additional energy into the reaction, each effect coordinated to control, time, and direct the energy released by the reaction to achieve maximum utilizable work.

As one illustrative example of application of the principles of this invention, a process has been developed in which a mass of metal powder is, in a single step, substantially simultaneously compacted and heated to form an almost solid article of a density equal to or greater than those achieved by conventional processes involving separate pressing and sintering steps. This is of considerable benefit because of the significant savings in time and power required to produce finished articles from powdered or particulate materials.

Other objects, applications, and advantages will be evident from a consideration of the following specification, the claims, and the accompanying drawings, in which:

FIG. 4 is a graphic presentation showing the variation in fluid pressure with respect to time during a cycle of operation of the apparatus of FIG. 2.

FIG. 5 is a top diagrammatic view of cylindrical conductor and its circuit connections showing the direction of forces due to explosion or vaporization of the conductor by a high energy electrical impulse.

FIG. 6 is a side elevational view of the conductor and connections of FIG. 5 showing the direction of the magnetic field forces.

FIG. 7 is a plan view showing the construction and positions of a massive outer conductor and an inner cylindrical conductor for making use of the cumulative magnetic effects of the current in each conductor and also the cumulative effects of explosion forces and magnetic effects.

FIG. 8 is a vertical cross sectional view through the structures of FIG. 7 with an additional showing of the circuit connections to achieve the desired effects.

FIG. 9 is a sectional view similar to FIG. 8 showing an alternative arrangement for applying an electrical impulse to each conductor.

FIG. 10 is a vertical sectional view of the main working component of a compacting or comminuting system similar to that shown in FIG. 1.

FIG. 11 is a sectional view of an alternative arrangement of the inner conductor.

FIG. 12 is a perspective view of an alternative arrangement of the inner conductor.

FIG. 1 is a vertical sectional view similar to the showing of FIG. 8 illustrating an arrangement of the conductors for providing a longitudinal variation in the forces applied to the material being worked upon.

The preferred embodiment of the present invention utilizes, in a novel manner and arrangement of structure, the violent forces resulting from the extremely rapid vaporization and explosion of an electrical conductor illustrated in part by FIGURE 5, and also the interacting electromagnetic forces between electrical conductors carrying current in opposite directions as illustrated in FIGURES 6, 7, 8, and 9. The magnetic forces on a current carrying conductor can cause compression of the conductor if the factors such as geometry, current, conductivity are carefully chosen. Part of these forces are due to the self-induced magnetic field, which is referred to as the "pinch" effect. A second part of these forces can be due to the field of another current carrying conductor, this force being known as "motor" force, shown by the large arrows in FIGURE 6. The pinch force will compress the conductor regardless of geometry, while the motor force will compress the conductor only if the currents in the two conductors flow in opposite directions and the outside edge of each conductor is restrained from moving. With a pair of concentric or coaxial conductors, such as are illustrated in FIGURES 7, 8, and 9, the motor force will augment the pinch force, since it is everywhere directed radially inward. In the application of this invention, this arrangement has been used to supplement the vaporization force and to prevent non-radial magnetic forces, which would inhibit the efficient generation of a shock wave when the metal vaporization occurs.

Figure 2:
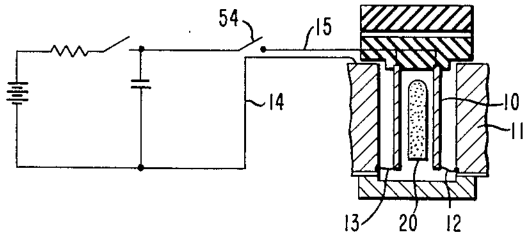
FIG. 2 is a basic schematic circuit diagram and partial sectional view of one arrangement of exploding conductor apparatus embodying features of the present invention.
Figure 3:
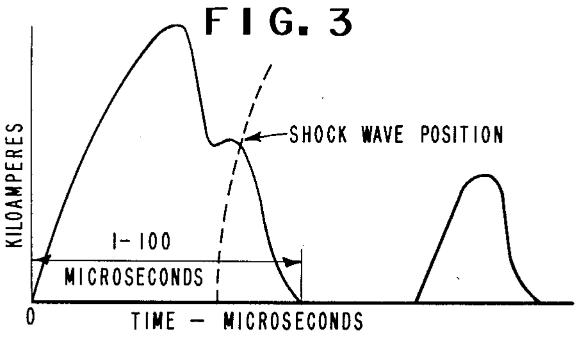
FIG. 3 is a graphic presentation showing the variation of current flow versus time during one cycle of operation of the apparatus of FIG. 2.

Generally speaking, the preferred arrangement, as illustrated in FIGURE 2, involves application of a very sudden high energy electrical impulse, of sufficient amplitude and duration to vaporize a metallic casing of given size, to a system comprising a vaporizable metallic casing 10 of such given size, and a relatively non-vaporizable outer conductor 11 surrounding said vaporizable casing and connected electrically in series therewith by connections 12, 13, 14, and 15. Upon application of the electrical impulse to the system, it will be found that a mass of material 20 placed inside said casing 10 will be subjected to shock waves and concentrated pressure and temperature effects of an extremely high order, which can accomplish useful work of various types upon the material. Pressure and current wave forms versus time are shown in FIGURES 3 and 4. The outer conductor 11 is so constructed and positioned to exert upon the inner casing 10 radially inwardly directed forces due to opposing magnetic fields as the electrical impulse causes current to flow in the outer conductor. At substantially the same time, the magnetic field created by current flow in outer conductor 11 will tend to induce in inner casing 10 a current flow in opposition to the main flow of current in the system due to the applied electrical impulse. At this point during development of the rapid electrical impulse in the system, it will be seen that the outer conductor current flow has applied compressive forces upon the inner conductive casing as well as induced in the inner casing current flow in opposition to the main electrical impulse through the system. Eventually, and actually a very short time interval later, the main electrical impulse, primarily due to thermal energy, overcomes the opposing forces in a sudden expansion or explosion of the casing into ionized vapor and particulate material concurrent with a sharp change in current discharge rate through the casing. The sharpness or rapidity of the vaporization and current change is accentuated by the earlier restraint imposed by the opposing forces applied to the casing by the initial action of the electrical impulse on the system. In other words, this restraint causes additional energy to be supplied to the inner conductor or casing over and beyond that which would ordinarily cause vaporization and explosion.

In addition, the collapse of the magnetic field caused by termination of current flow in the outer conductor cooperates with the effect of shock waves and pressure from the inner conductor at about the explosion point to create in the outer conductor an additional surge of current which feeds additional energy into the inner conductor reaction. During the explosive vaporization of the casing 10, the outer conductor 11, because of its rigidity and inertia serves to reflect and direct the shock waves inwardly and to confine pressure generated by the reaction so that the total effects are applied to and concentrated in the space inside the casing 10. Any material 20 occupying this space will be subjected not only to great pressure but also to the high temperatures generated by passage of the shock waves. Proper design and spacing of the outer conductor 11 with respect to the inner casing 10 can produce multiple reflections of shock and pressure waves, and even standing wave effects concentrated as desired in material occupying the space inside the casing 10.

One very useful application of this arrangement is the formation of solid articles from particulate material by the pressure and heat effects generated. To accomplish this, a mass of particulate material is positioned inside casing 10. Under some conditions, it is helpful to enclose the material in a thin plastic package for convenience in handling and supporting in desired position. Powdered iron, aluminum, titanium, and niobium have been successfully formed into solid articles and it is believed that many other powdered materials including plastics may be similarly handled. The annular space between casing 10 and outer conductor 11 may contain a gas, a fluid, or be evacuated. However, the preferred medium in this space is a liquid such as water. The space between the casing 10 and the mass of material 20, including the space between the units of particulate material, is filled with a highly elastic energy absorbent fluid of low density and bulk modulus, preferably a gas such as air. Under these conditions, application of the high energy electrical impulse to the system will operate as discussed in the preceding paragraphs to compress the particulate material into a coherent mass of great density, high uniformity, strength, and without formation of cracks. Furthermore, photomicrographs of the grain structure of such a mass indicate that a welding together of the particles has taken place. In effect, physical compaction and partial fusion of the particles have occurred almost simultaneously, or at least concurrently. The fusion effect is believed to be due to the heat generated in the shock waves and by the friction between particles due to the very high rate of doing work. Unsintered compaction densities approaching the theoretical limit have been achieved in the single operation which are greater than those achieved by present commercial methods.

It has been determined that materials such as steel can be used satisfactorily for the outer conductor 11 and for any closure members used therewith. Insulating members should have good electrical insulating and shock absorbent characteristics, such as possessed by phenolic materials of which "melamine" is an illustrative example. The best materials for the inner conductor or casing 10 are metals having high melting points and good electrical conductivity, such as brass, copper, aluminum. The conductor connections are prefereably of silver-plated copper, or similar to those used in high frequency radio equipment.

A coaxial apparatus arrangement for the treatment of 50 to 150 gram quantities of iron powder would have the following approximate dimensions:

| | Inches |
|---|---|
| Inner conductor, thickness | 0.001 |
| Inner conductor, diameter | ⅝ |
| Inner conductor, length | 2½ |
| Outer conductor, inside diameter | 2 |
| Outer conductor, outside diameter | 4 |
| Outer conductor, length | 2½ |

In addition, several end members, preferably steel blocks 6 inches in diameter by 6 inches long, are used to provide inertia resistance against pressure exerted through the ends of the outer conductor.

The following table sets forth representative quantitative values for variables such as voltages, currents, pressures, capacitance, and time periods involved in practicing the indicated applications of this invention.

This application of the apparatus to comminution has been found useful in the specialized case of separating strongly coherent agglomerated masses of specially shaped particles without breaking up individual particles. An example of this type operation is the breaking down of agglomerated fibrous potassium titanate masses into discrete fibers or rod-like particles for further use or processing. Such an operation is called exfoliation.

In FIGURE 10 is shown a version of the apparatus embodying features of the invention which is capable of being adapted to a continuous process of compaction or comminution in which discrete bodies of material are treated successively. This is comprised of a hollow cylindrical steel body 50 with one closed end and one open end, the latter resting or urged into electrical contact with a massive steel base 51; the closed end of the body 50 is provided with a concentric electrically conductive electrode 52, which passes through the body 50 and is

*Table I*

| Type of Operation | Capacitor (mfd.) | Voltage (kv.) | Current (amps.) | Energy (joules) | Pressure (p.s.i.) | Discharge Time (Micro-sec.) |
|---|---|---|---|---|---|---|
| Compaction of 100–200 mesh iron powder to 90% of theoretical density in 50 to 100 gram quantities | 350–400 | 8–10 | 100,000 to 200,000 | 11,000 to 20,000 | 50,000 to 100,000 | 20 to 40 |
| Comminution of spong-like (dendritic) structures such as titanium in 100–150 gram quantities | 350–400 | 4–8 | 50,000 to 150,000 | 2,800 to 11,000 | 50,000 to 300,000 | 5 to 20 |
| Exfoliation of needle-like materials such as fiberous potassium titanate | 170–400 | 7 | ---------------- | 4,200 to 10,000 | 50,000 to 100,000 | 20 to 40 |

When parallel-connected capacitors in a surge bank are used as the source of electrical input energy, their inductance should be low compared to their capacity, so that their self-resonant frequency is greater than about 15 kilocycles per second.

Another useful application involves the simultaneous comminution of integral sponge-like masses of material into very small uniform powder-like particles. This offers great advantages over the present methods of comminuting "sponge-like" materials which are considered inadequate as regards fineness of particles produced, severe process limitation such as tool wear, contamination of product, cost, and excessive work hardening of the comminuted material. Substantially each of these areas of inadequacy are greatly improved or eliminated by the arrangement of embodying features of this invention. The apparatus and operation are the same as that discussed in the preceding paragraphs covering compaction of particulate material, except that an integral sponge-like mass is positioned inside casing 10 and the entire remaining space within the casing 10, including the pores of interstices within the sponge-like mass, is preferably filled with a relatively incompressible liquid medium, having a high bulk modulus and a mass density comparable to that of the material being treated; typically, water may be used, however, carbon tetrachloride is another suitable medium. The annular space between the casing 10 and the outer conductor 11 may contain a gas, a liquid, or be evacuated; however, the preferred medium in this space is a liquid such as water. The incompressible liquid should be in intimate contact with the sponge-like mass throughout its structure. Under these conditions, when the electrical impulse is applied to the system the operation will be similar, except that the shock waves directed upon the liquid-filled sponge-like mass will undergo multiple reflections, refractions, and diffractions causing non-uniform pressures which, in effect, "blows up" or explodes the sponge-like or porous mass into very fine particles. Possible expansion effects due to heating action of the shock waves may contribute to the action. In addition to comminution of titanium sponge, aluminum oxide, zinc oxide, and solid aluminum have been similarly treated to create particles which appear to be in the submicron range, based upon precipitation experiments.

insulated therefrom by insulator 53. The electrode and the base are separately connected with suitable conductors to opposite sides of a high voltage switch device 54 and a bank 55 of parallel-connected capacitors.

Figure 1:
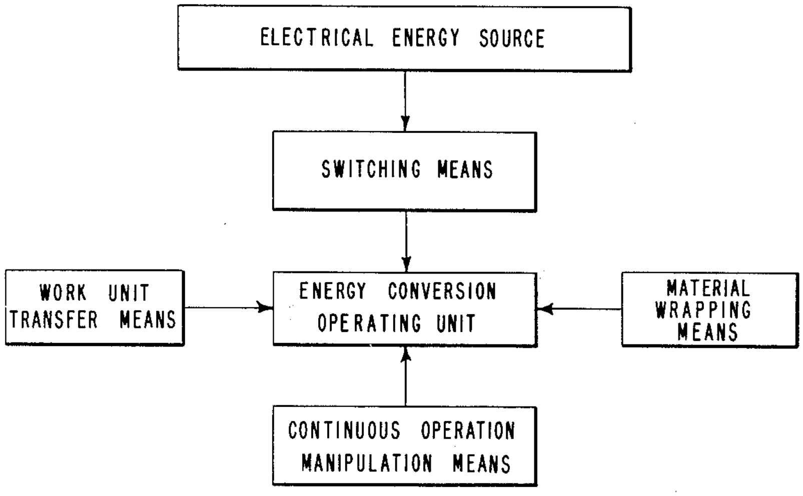
FIG. 1 is a schematic block diagram of the basic component units of the system embodying features of the present invention.

The material 57 to be treated is shown as being contained in a sheath of metal foil 56 forming the inner conductor and is disposed concentrically within the body 50, the ends of the metal sheath 56 being in electrically conductive contact with the electrode 52 and the steel base 51. The remaining space within the body 50 may be completely filled with water and essentially the entire body may be immersed in water. The remainder of the apparatus comprises, as shown schematically in FIGURE 1, a means for encapsulating or wrapping in metal foil the material into position under body 50, means for moving body 50 generally up and down, means for coordinating the various motions and events, and means for ejecting or discharging the end product; the overall machine could be of the indexing rotary turret type, the straight-line motion indexing type of continuously rotating type. In the latter case, the material in process would be carried from work-station to work-station by means of a constant velocity carrier chain. In operation, successive portions of the material to be treated are fed to the encapsulating or wrapping station and wrapped in foil, each discrete portion being transported in turn to a work-station, dwelling therein while the body member is lowered, and filled with fluid (if used), connected electrically, and energized; upon "firing" of the foil, the body member is raised or opened and the worked material is ejected or removed.

In a variation, shown in FIGURES 11 and 12, the encapsulated material 57 is covered with a plurality of annular layers of foil 156, 256, joined or of one piece, at alternate ends such that successive layers are in opposed series circuit relation along the long dimension of the foil and parallel to the tube axis. Adjacent layers are insulated from each other by elements 158, 258 except at junctures or bends at the alternate ends. With such configurations of the foil, the pinch or compressive force on the encapsulated material is augmented.

Figure 17:
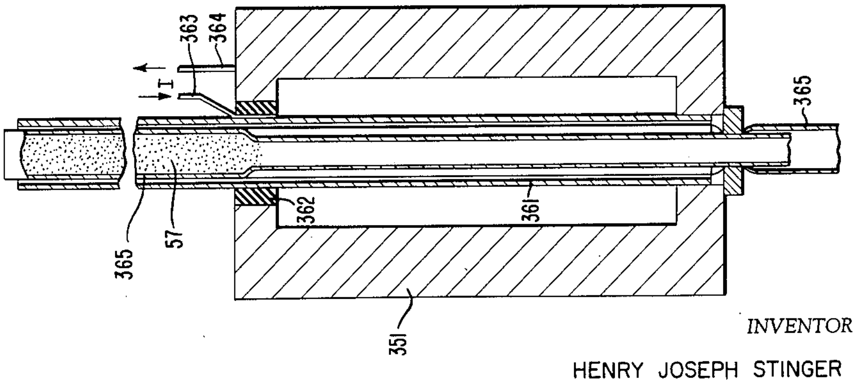
FIG. 17 is a vertical sectional view of yet another main working component of a modified system embodying features of this invention, in which successive portions of a tubular inner conductor are fired or vaporized to operate on a continuous basis.

FIGURE 17 shows another example of an apparatus capable of continuous operation in which material to be treated is fed intermittently through the apparatus and is treated by application of energy after each feed step.

This apparatus is adapted for the treatment of particulate material or integral sponge-like masses, the product emerging, respectively, in the form of a continuous length of compacted rod or in the form of a stream of powder or particles. The apparatus comprises a heavy-walled, cylindrical steel body 351 with axial, throughgoing holes at each end having a closely fitted, thin-walled metal tube 361 therein. The metal tube is situated in electrical contact with the body at the lower end and in contact with an insulated contact ring 362 at the upper end. Suitable conductors 363, 364 are joined to the inner periphery of the contact ring and the body at its upper end, and lead to a switch and thence to a source of high energy electrical power. Within the tube is a closely-fitting, elastomeric tube 365 containing particulate material 57. Both the metal tube and elastomeric tube are of extreme length as compared with the length of the body. The annular space between the elastomeric tube 365 and the interior of the metal tube 361 is completely filled with water, as is the interior cavity of the body 351. In operation, the apparatus is electrically energized, the portion of the thin wall metal tube 361 within the body becomes vaporized, or is exploded, and the particulate material is thereby compacted. The apparatus is then disconnected from the power source, whereupon a new portion of metal tube along with a new portion of elastomeric tube and a new portion of particulate material is advanced axially from above the body until the metal tube again extends from top to bottom of the body, the apparatus then being in readiness for another cycle of events.

When the various elements are advanced or indexed axially through the body, the metal tube may be moved through a greater distance than is the elastomeric tube or the particulate material, so that short lengths of the material being worked on may be subjected to a succession of "shots" or compacting impulses. As an alternative construction, the metal tube may be replaced by a pair of closely spaced concentric plastic tubes containing a conductive fluid, such as mercury, in the annular space between them.

Figure 15:
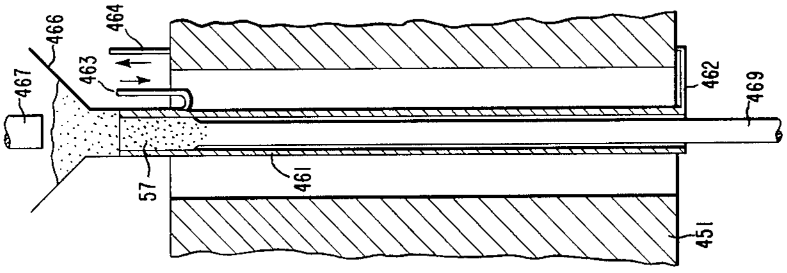
FIG. 15 is a vertical sectional view of another main working component of modified apparatus embodying features of the invention and which makes use of successive shock and pressure waves created by electromagnetic forces only to operate on a substantially continuous basis.

It has been determined that very satisfactory compaction forces can be generated by utilizing a non-vaporizable inner conductor, for casing 10 as shown in FIGURE 2, to apply the compacting force to a mass of material contained within it. In this version of the apparatus, the compacting forces are the result of shock waves caused by the interacting magnetic field forces. Since the inner conductor is not vaporized or destroyed, the mass of material within it can be subjected to a series of compacting impulses, of increasing amplitude if desired. One example of this apparatus is shown in FIGURE 15. The apparatus shown in this figure is primary adapted for compacting particulate material, the product emerging in the form of a continuous length of rod.

A vertically disposed tubular inner conductor 461 is arranged concentrically within an outer conductor 451, the two being electrically interconnected to each other at their lower extremities by means of one or more conductors 462. At their upper extremities, the inner and outer conductors are individually joined to separate conductors 463 and 464 which connect to a switch means and a high energy electrical power source.

Immediately above the tubular inner conductor is a funnel-shaped feed hopper 466 and a cylindrical ram 467, all being in axial alignment. The ram is adapted to be driven axially, by an actuating mechanism (not shown), through the neck of the funnel 466 and at least part way into the interior of the inner conductor 461.

In operation, particulate material is charged into the feed hopper 466 and the tubular inner conductor 461. The apparatus is then energized from the power source, giving rise to magnetic field forces which cause the inner conductor 461 to contract elastically, thus compressing the particulate material into a substantially solid rod 469 throughout most of its length, but leaving a mass of unworked particles 57 at the top. The inner conductor 461 is not destroyed or vaporized by the electrical impulse applied. The impulse is delivered in a very short time interval, whereupon the inner conductor springs back elastically to its initial dimensions. The ram 467 is caused to descend, driving a new charge of particles into the tubular inner conductor 461 and driving a length of compacted rod 469 out of the bottom of the apparatus. The ram is then withdrawn, whereupon the apparatus again may be electrically energized and the cycle of events repeated as desired. The inner conductor 461 may be made of metal, which will somewhat limit the degree of compaction obtainable, or the inner conductor may be made of a pair of concentric plastic or elastomeric tubes containing between them an electrically conductive liquid, such as mercury. The compacted portion of the rod 469 is not self-supporting, being relatively weak at its juncture with the particulate portion. Therefore, restraint is provided on the rod by means of a frictional drag at the bottom of the apparatus. The prime mover for the ram must be capable of overcoming this drag when the ram and product are driven down.

Figure 16:
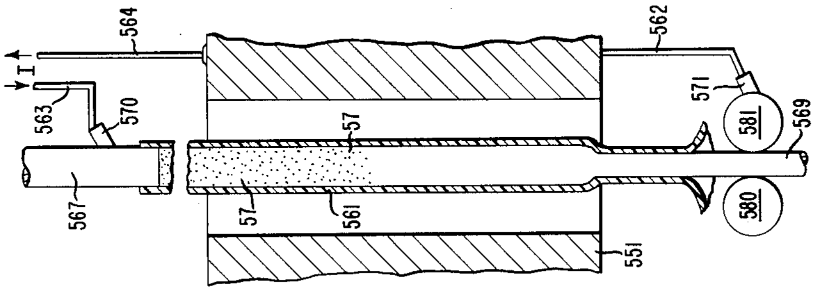
FIG. 16 is a vertical sectional view of another main working component of modified apparatus embodying features of the invention in which successive pressure pulses in fluid created by magnetic pinch forces are utilized for working on successive masses of material in a continuous operation.

Another example of modified apparatus for continuous treatment of material by successive shock waves utilizing magnetic forces is shown in FIGURE 16. In this version of structure embodying features of the invention, the material undergoing treatment forms a portion of the current carrying path. The material 57 undergoing treatment is disposed coaxially with respect to the outer conductor 551. The material is contained in an elastomeric tube 561, which tube also engages a portion of a ram member 567 at the top of the apparatus.

The ram member 567 is maintained in electrical contact with the particulate material 57. A suitable brush device 570, preferably carbon, is maintained in electrical contact with the periphery of the ram 567 and is connected through suitable switching means (not shown) to a high energy electrical power source (not shown). At the lower end of the apparatus, material 569 which has been compacted remains enclosed in the elastomeric tube 561 for a short distance. A slitting blade or other cutting means (not shown) is provided to cut the elastomeric tube, generally along a line parallel to the tube axis in one or more places. At the lower extremity of the apparatus is a pair of opposed, frictionally braked (rotationally) wheels 580 and 581, located on opposite sides of the compacted material and biased toward each other, so that they grip the compacted material 569. One or more of the wheels 580 and 581 is provided with a brush 571 in electrical contact therewith, which brush is suitably connected electrically to the outer conductor 551.

In operation, the ram 567 is driven downward in the axial direction either continuously or intermittently, thus driving the particulate material 57 and compacted material 569 downwardly. Successive pulses of electrical current flow through the conductor 563, the brush 570, the ram 567, the particulate material 57, the compacted material 569, the wheels 580, 581, the wheel brush 571, and thence through the outer conductor 551 and back to the source of electrical energy. The pulses of energy cause compaction of the particulate material as previously described. The exposed elastomeric tube 561 at the lower end is cut and withdrawn from the compacted material and is discarded to expose the compacted material 569 so that it may make electrical contact with the wheel 581. The frictional drag on the wheels prevents both the compacted material and the particulate material from falling through the apparatus, it being understood that the drive means for the ram is capable of overcoming the frictional drag.

Figure 18:
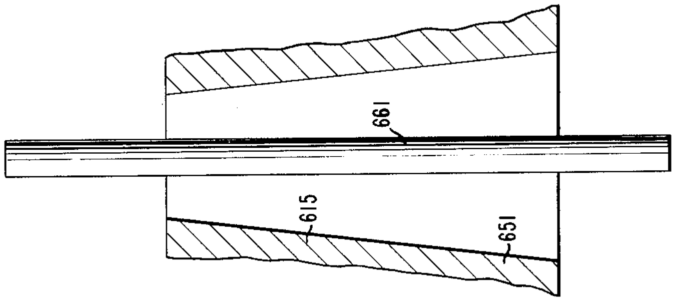

FIGURE 18 illustrates a variation of the outer conductor structure of the apparatus shown, for example, in FIGURES 15 or 16. Since the electromagnetic force exerted between conductors varies inversely with the distance separating them, the construction shown is a convenient way to provide an end to end variation in force on the material being worked. As the radial distance between the conductors increases, the amount of force exerted will diminish. Thus, FIGURE 18 shows an outer conductor 651 having an inner surface 615 which is generally conical with the greater diameter at the lower end of the apparatus.

Other variations of this approach are possible. For example, the outer conductor 651 of FIGURE 18 could be inverted, or barrel-shaped, or hourglass-shaped, or a combination of these shapes. In any event, this approach causes gradients in the forces per unit area exerted on the material being worked. This effect may be used for partial compaction of the material initially in order to enhance its column strength to make the material self-supporting, in which case the elastomeric tube could be stationary and need not extend all the way through the apparatus.

Figure 20:
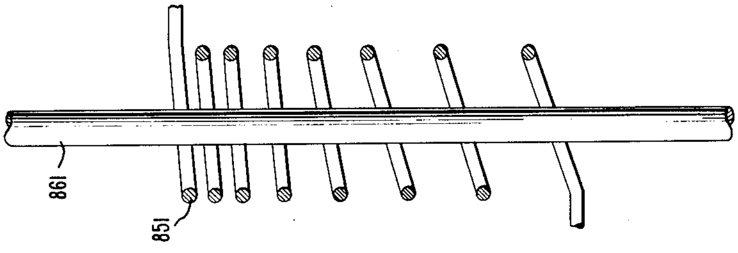
FIG. 20 is a vertical sectional view showing a further modification of the outer conductor of this system, which produces a longitudinal vraiation in the forces applied to the work material.
Figure 19:
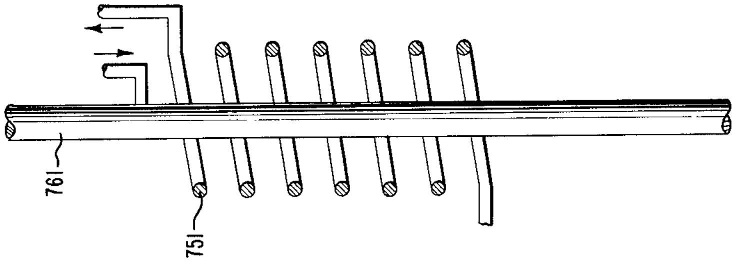
FIG. 19 is a vertical sectional view showing a modified version of the outer conductor of the system of this invention.

FIGURES 19 and 20 show yet another variation in the configuration of the outer conductor 751, 851 which may be utilized in the construction of the apparatus, for example, the versions of FIGURES 15 and 16. The outer conductor 751 shown in FIGURE 19 is a coil of wire helically wound and of a constant pitch. The outer conductor 851 of FIGURE 20 is a coil of wire having a varying pitch. In both cases, the mean diameter of the coil is shown as being constant, however, the mean diameter can also vary from end to end of the apparatus. In all applications using coils of this nature, the shape of the magnetic fields will be different from the embodiments shown in FIGURES 15, 16, 17, and 18. It will be clear that varying pitch or diameter, or both, will provide a pressure gradient from end to end of the apparatus, on the material being worked.

FIGURE 9 illustrates a modified circuit arrangement for passing electrical impulses in different directions from different sources (not shown) through the inner and outer conductors 72 and 71.

The principles of this invention may be used advantageously in connection with apparatus which converts the energy of a high energy electrical impulse into shock waves and pressure impulses by means of an electrical arc or spark in a fluid medium. By using apparatus similar in some respects to that in which the exploding conductor is used, for example, the structures shown in FIGURES 13 and 14, it is possible to use the compressive delay effects created by the current in the outer conductor to restrain the arc reaction for a given time period so that additional energy is stored up for release in a sudden accentuated arc discharge causing great shock wave and pressure wave effects. The outer conductor also serves to concentrate and direct the effects of the arc discharge in the desired direction and to feed additional energy into the arc reaction due to shock wave effects occurring concurrently with the magnetic field collapse in the outer conductor. The use of arc discharges does not produce shock wave and pressure effects as great as those created by exploding conductors. The disclosed exploding conductor applications of this invention provide excellent geometrical control of the reaction and the forces generated by it. This permits the forces to be directed very effectively as desired and also permits variations in the application of the forces by different configurations of the inner exploding conductor. In addition, annular construction of the inner conductor produce the annular discharge which is extremely difficult or impossible to produce by other means, such as by an arc or jump spark.

Figure 14:
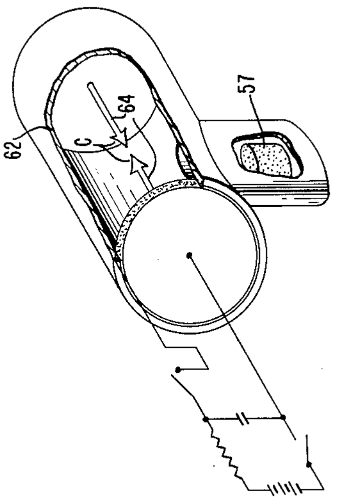
FIG. 14 is a sectional view of a variation of the arrangement of FIG. 2 which utilizes an electrical discharge in a gap in place of the exploding conductor.
Figure 13:
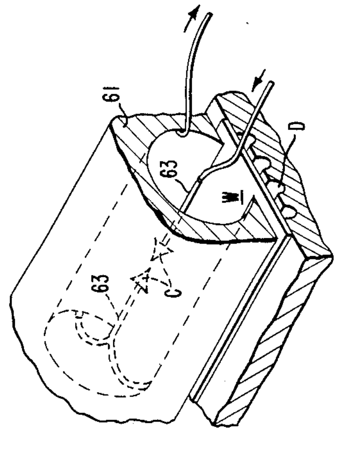
FIG. 13 is a sectional view of an arrangement embodying features of this invention for forming a plate against a die member.

The apparatus shown in FIGURES 13 and 14 are designs for forming and compacting masses of material by application of the controlled shock waves and pressure waves upon or against the material. The effects of the current build-up in the outer conductors 61 and 62 on the inner conductors 63 and 64, respectively, is similar to the effects on the inner conductor of the exploding conductor apparatus, except that, in this case, the inner conductor in effect is broken with the spaced arc contacts C placed at the central portion thereof. The outer conductor is of a configuration which substantially surrounds the inner conductors and the arc contacts in order to apply the compressive, confining and delay effects on the reaction, but, in addition, must provide openings or means for directing the effects of the arc discharge reaction as desired.

FIGURE 13 illustrates an apparatus arrangement for using the directed effects of the accentuated arc discharge to form a plate-like work piece W against a forming die D.

The arrangement of FIGURE 14 shows a version of the apparatus for compacting a mass of material 57 by directing the effects of the accentuated arc discharge.

With respect to the fields of forming articles of powdered or particulate material, this invention provides a way of accomplishing the forming operation in a rapid economical manner using little heavy machinery or equipment. In addition, it is possible to achieve not only compaction but a limited fusion effect in a single operation to give finished articles of uniform high density without cracks. In some cases it has been observed that the length to diameter ratios of the articles compacted according to this invention are not nearly as critical as in the conventional compacting processes arrangements by a significant factor. A hardening effect has also resulted from this forming method.

This invention offers definite advantages in its applications to the field of comminuting "sponge-like" or porous agglomerated masses such as titanium sponge. It is possible to achieve uniform particles of extremely small size in a manner which avoids the prior art problems of high tool wear, contamination of end product, and excessive work hardening of the comminuted material which occurs in conventional processes such as ball milling. The cost of operating this new arrangement for comminution is reduced significantly due to the high efficiency of converting the electrical impulse to the shock wave or pressure impulse which are applied to the material.

The present invention as embodied in the disclosed methods and apparatus has been utilized successfully to initiate chemical reactions in a mass of mixed chemical components in order to produce a final chemically united body of uniform properties.

It will be obvious to those skilled in the art that many modifications may be made with respect to the methods and apparatus disclosed herein without departing from the spirit of the invention and the scope of the following claims.

I claim:

1. Electromagnetic apparatus for subjecting a mass of material to concentrated shock and pressure waves comprising high power electrical supply means, a first fixed position conductor member provided with a cavity therein, a second movable conductor member positioned in said cavity and spaced from said first conductor member, means for supporting a mass of material adjacent said second conductor member, electrical means connecting said power supply means to said first and second conductor members for applying rapid high power electrical impulses thereto to cause sudden currents to flow in said conductor members in directions which create high intensity opposing magnetic field effects with a resultant reaction on said conductors tending to move said conductors in a direction such that high energy pressure impulses and shock waves are applied to said mass of material by said second conductor.

2. In combination, means for producing a sudden high energy electrical impulse, means for applying such an energy impulse to a first conductor and to a second conductor in series with said first conductor, said first conductor provided with a passageway therethrough, said second conductor positioned centrally in said passageway and provided with a chamber aligned with the passageway in said first conductor, said chamber arranged to contain and support a charge of material so that application of a sudden electrical energy impulse to said conductors in series produces a resultant inwardly directed pressure impulse originating from both said conductors to heat and perform useful work on a charge of material in said chamber.

3. Electromagnetic apparatus for subjecting a mass of particulate conductive material to concentrated shock and pressure waves comprising high power electrical supply means, a first conductor element provided with a passageway therethrough, said passageway having a first end and a second end, an elongated tubular member positioned centrally in said passageway and generally aligned with said passageway, said tubular member constructed and arranged to contain a mass of particulate material and positioned the same centrally of said passageway, a second conductor element mounted adjacent said first end of said passageway for engagement with particulate conductive material contained in said tubular member, a third conductor element mounted adjacent said second end of said passageway for engagement with conductive material engaged by said tubular member, electrical means connecting said power supply means to one of said second and third conductor elements, conductive material contained in said tubular member between said second and third conductor elements, and said first conductor element in series for applying rapid high power electrical impulses thereto to cause sudden current to flow in said conductor elements and said material in directions which create high intensity opposing magnetic field effects with resultant reaction between said first conductor element and said particulate conductive material which reaction involves a high energy impulse tending to compress and compact said material.

4. The apparatus of claim 3 which further comprises means for conveying compacted material out of said passageway, and means for conveying material into said passageway.

References Cited by the Examiner

UNITED STATES PATENTS

| | | | |
|---|---|---|---|
| 3,088,200 | 5/63 | Birdsull et al. | 29—421 |
| 3,149,372 | 9/64 | Stinger | 18—5 |

OTHER REFERENCES

"Exploding Wires"—Edited by Chase & Moore, Plenum Press Inc., New York, 1959, Qc703c5.

RICHARD M. WOOD, *Primary Examiner.*